(12) United States Patent
Slawinski

(10) Patent No.: US 12,475,222 B2
(45) Date of Patent: Nov. 18, 2025

(54) METHOD AND APPARATUS FOR MAPPING SIMILARITY SPACES

(71) Applicant: Crowdstrike, Inc., Sunnyvale, CA (US)

(72) Inventor: Michael Slawinski, Rancho Santa Margarita, CA (US)

(73) Assignee: Crowdstrike, Inc., Sunnyvale, CA (US)

( * ) Notice: Subject to any disclaimer, the term of this patent is extended or adjusted under 35 U.S.C. 154(b) by 274 days.

(21) Appl. No.: 18/306,849

(22) Filed: Apr. 25, 2023

(65) Prior Publication Data
US 2024/0362326 A1 Oct. 31, 2024

(51) Int. Cl.
*G06F 21/00* (2013.01)
*G06F 21/56* (2013.01)
(52) U.S. Cl.
CPC ...... *G06F 21/562* (2013.01); *G06F 2221/033* (2013.01)

(58) Field of Classification Search
CPC .. G06F 21/562; G06F 2221/033; G06F 40/20; G06F 16/2237; G06F 16/3329; G06F 16/3344; G06F 16/3347; G06F 16/90332; G06F 40/40; G06F 18/214
See application file for complete search history.

(56) References Cited

U.S. PATENT DOCUMENTS

2021/0141897 A1* 5/2021 Seifert .................. G06F 21/565

* cited by examiner

*Primary Examiner* — Tri M Tran
(74) *Attorney, Agent, or Firm* — Elliott, Ostrander & Preston, P.C.

(57) ABSTRACT

A method for selecting a region of a similarity space in which to locate a file. Numerous files are received, and feature vectors for each of the received files is created, each feature vector comprising values representing corresponding features for the file. A respective similarity space is created for each of the respective number of feature vectors, each respective similarity space comprising several regions. One of the regions of the respective similarity space is selected in which a respective representation of each file is located based on the respective feature vector for the file. A map of relationships between one or more regions of the similarity spaces is then constructed.

20 Claims, 7 Drawing Sheets

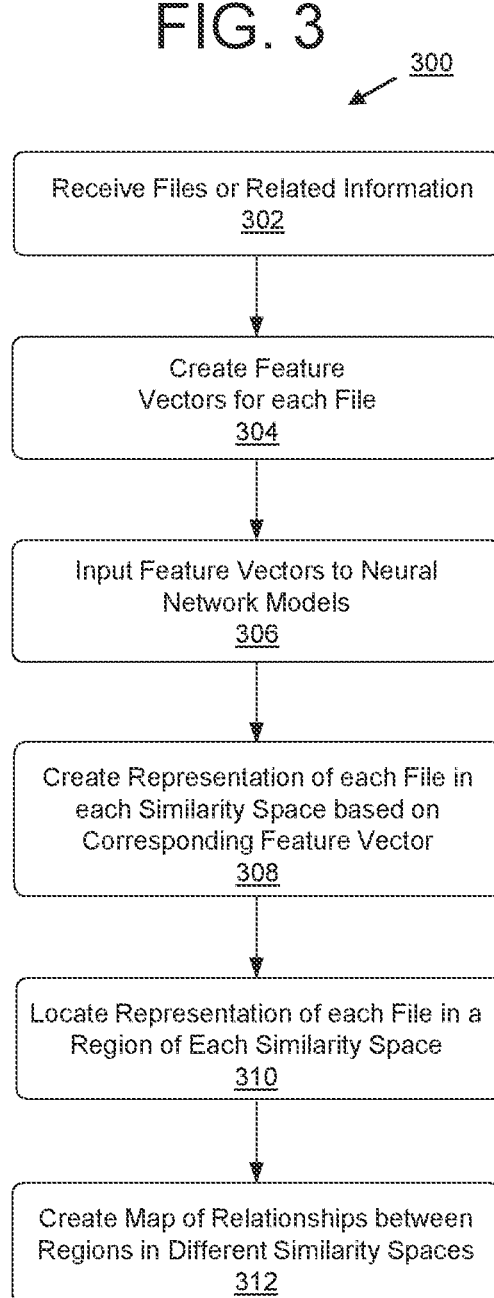

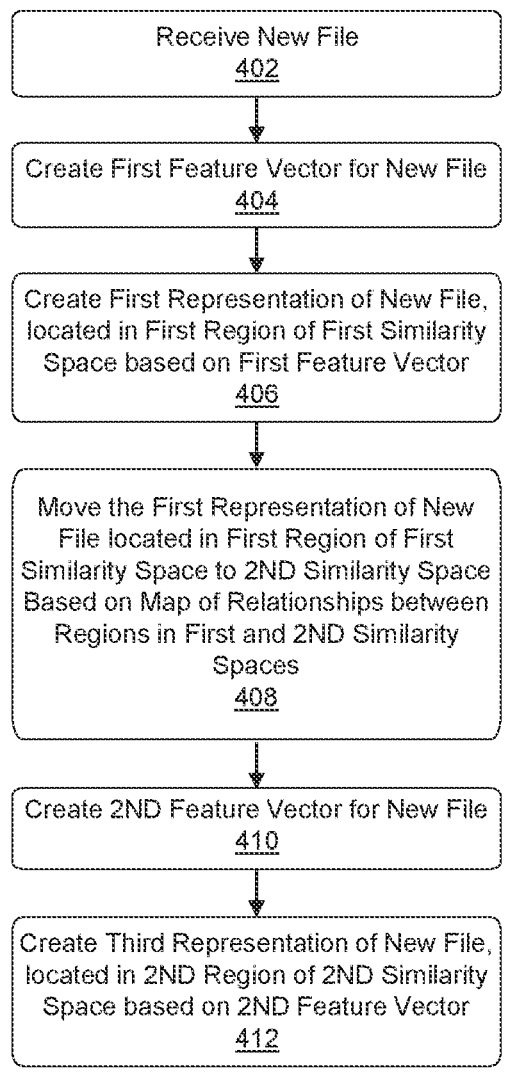

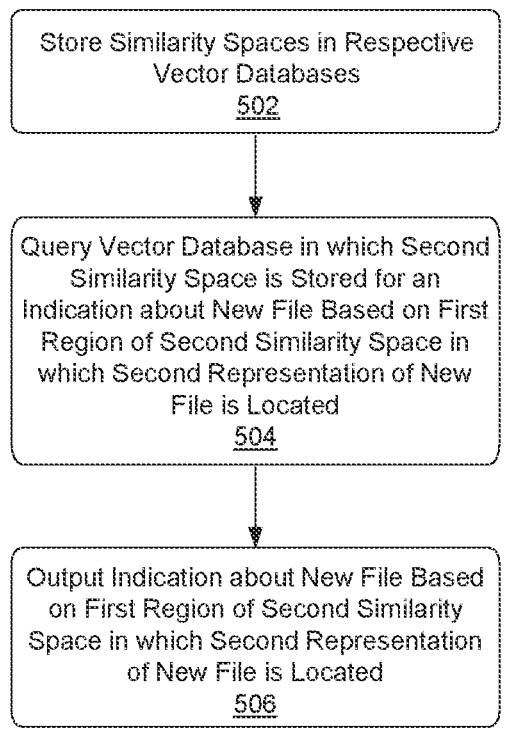

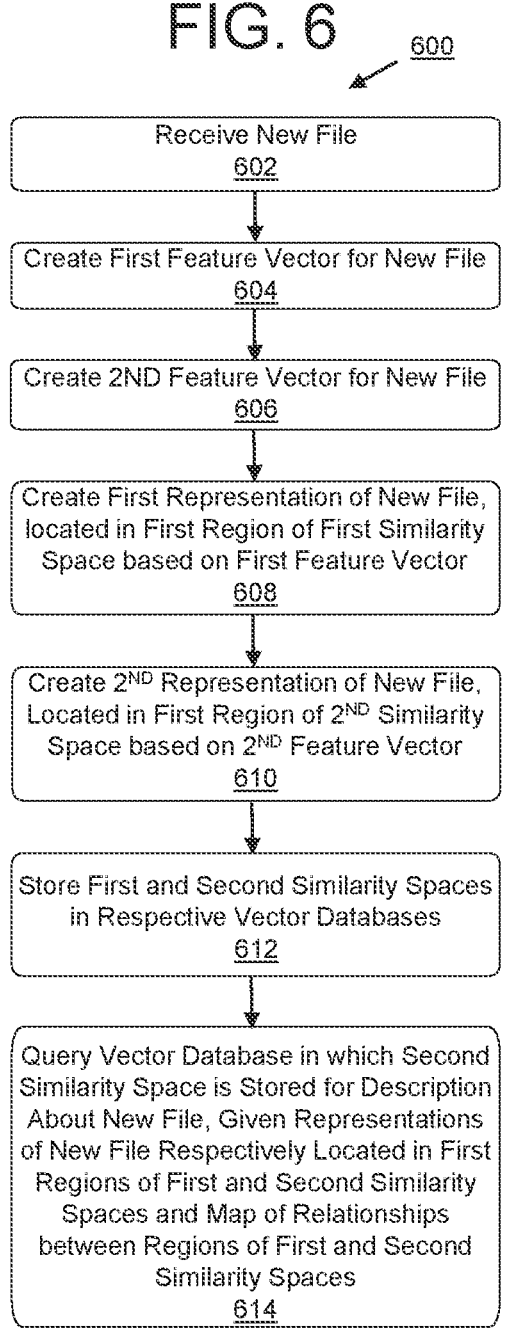

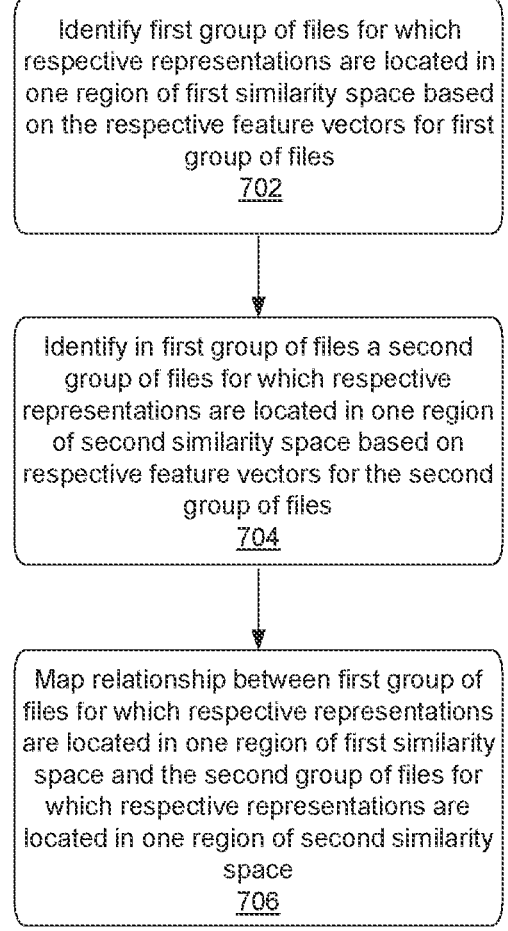

METHOD AND APPARATUS FOR MAPPING SIMILARITY SPACES

CROSS-REFERENCE TO RELATED APPLICATIONS

This U.S. Patent Application is related to U.S. patent application Ser. No. 18/183,882, entitled "METHOD AND APPARATUS FOR EVALUATING SIMILARITY BETWEEN FILES", filed Mar. 14, 2023, the disclosure of which is incorporated by reference herein in its entirety.

TECHNICAL FIELD

Embodiments of the present disclosure relate to digital computing systems, particularly with respect to mapping similarity spaces and selecting a region in which to locate a file in a similarity space based on a region in which the file is located in another similarity space and a map of relationships between the regions of the similarity spaces.

BACKGROUND

Digital security exploits that steal or destroy resources, data, and private information on computing devices are a problem. Governments and businesses devote significant resources to preventing intrusions and thefts related to such digital security exploits. Some of the threats posed by security exploits are of such significance that they are described as cyber terrorism or industrial espionage.

Security threats come in many forms, including computer viruses, worms, trojan horses, spyware, keystroke loggers, adware, ransomware, coin miners, and rootkits. Such security threats may be delivered through a variety of mechanisms, such as spearfishing emails, clickable links, documents, executable files, or archives. Other types of security threats may be posed by malicious actors who gain access to a computer system and attempt to access, modify, or delete information without authorization. With many of these threats, one or more files containing malicious code can be downloaded or otherwise installed on a computing device, or an existing one or more files on the computing device can be modified to include malicious code. Sometimes, the file contents, file names, file types, or file extensions of the files that contain source or executable code, malicious or otherwise, may be modified so that it is not readily apparent what the files contain.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates a flowchart of certain aspects of a method to construct and map regions of similarity spaces according to example embodiments of the present disclosure.

FIG. 4 illustrates a flowchart of certain aspects of a method to locate a new file in a region of a similarity space according to example embodiments of the present disclosure.

FIG. 5 illustrates a flowchart of a method to query one or more similarity spaces according to example embodiments of the present disclosure.

FIG. 6 illustrates a flowchart of certain aspects of a method to locate a file in a region of one similarity space and output a description about the file based on its location in a region of another similarity space and a map of relationships between regions of the similarity spaces according to example embodiments of the present disclosure.

FIG. 7 illustrates a flowchart of a method to map relationships between regions of different similarity spaces according to example embodiments of the present disclosure.

DETAILED DESCRIPTION

Figure 1:
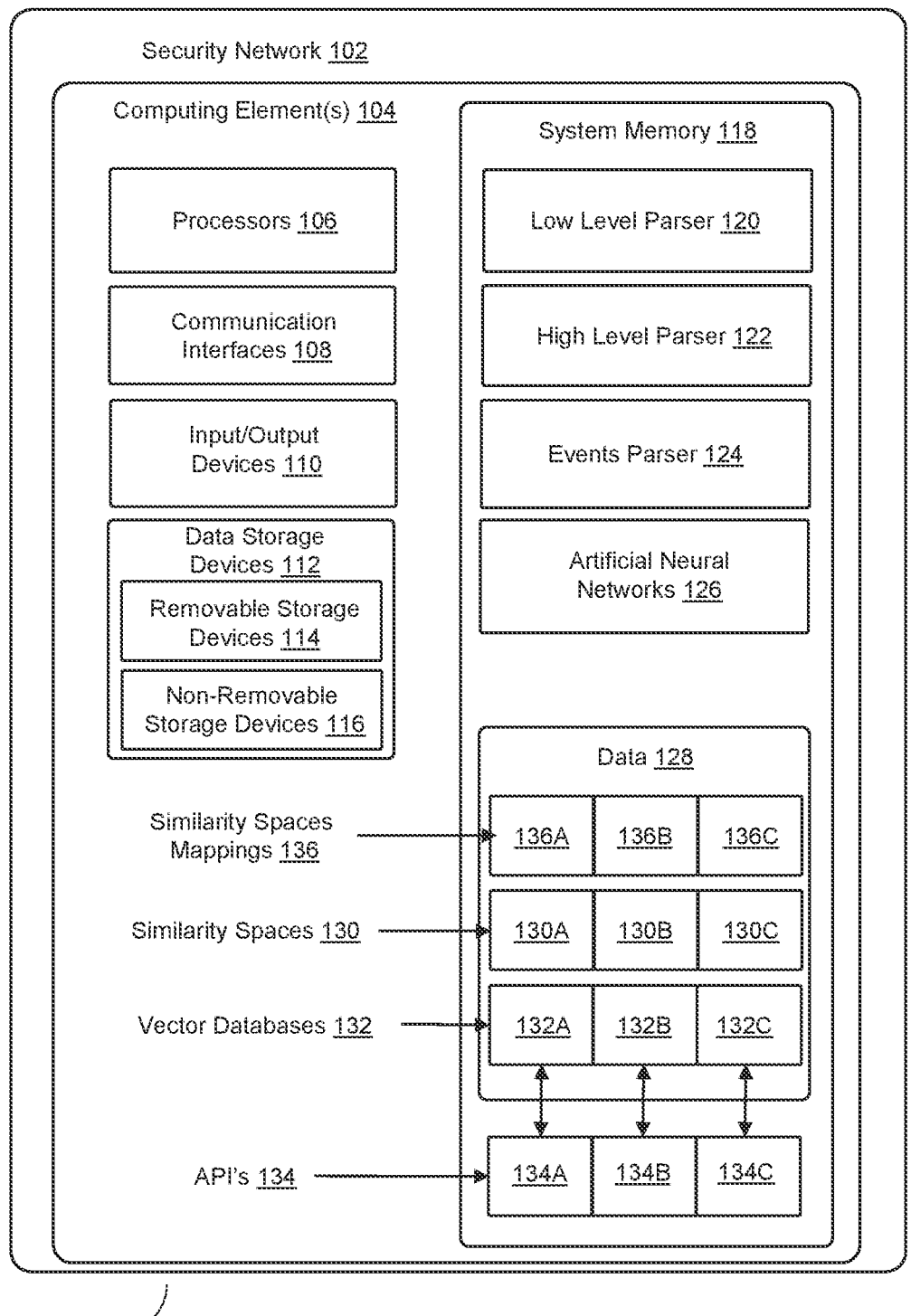
FIG. 1 illustrates an example architecture of a security network in which embodiments of the present disclosure may be used.

A similarity space defines a point of view regarding similarity between objects, such as similarity between files, or the contents, aspects, events, representations or information relating thereto, or features thereof. One similarity space may adjudicate two files as similar or not based on the similarity, or not, of one set of features for the two files. For example, the similarity space may consider two files similar based on a comparison of a first set of features, e.g., low-level features, for the two files, such as how and when the files were constructed or modified. Such low-level information may be obtained from metadata associated with the files. Another similarity space may adjudicate the same two files as similar or not based on the similarity, or not, of a second, different, set of features for the two files. For example, the other similarity space may consider two files similar based on a comparison of high-level features for the two files, such as the run-time behavior of, or events pertaining to, the files, or whether the files belong to the same family or type of files. For example, the other similarity space may consider two files similar if, when the files are executed, they operate in a similar manner, or perform or conduct similar events, whether maliciously, as in the case of computer viruses, worms, trojan horses, spyware, keystroke loggers, adware, ransomware, coin miners, and rootkits, etc., or in a benign manner. Such high-level information may be obtained, for example, from descriptive or human-readable tags, or simply "tags", another form of metadata associated with each file that identify specific types of runtime behavior for the file, whether that runtime behavior is malicious, anomalous, or benign, or that identify a family or category of files of which the file is a member.

One similarity space is not necessarily better than another similarity space. One similarity space is not necessarily right while the other similarity space is wrong. There may be no objectively best similarity space. The structure or paradigm of a particular similarity space is simply a function of a chosen point of view, which may be determined, for example, by a particular use case.

That said, a malicious actor or malicious software may alter or manipulate a file in such a manner that one similarity space may be fooled in adjudicating the altered or manipulated file and the original file or files similar to the original file as either similar when they are not (a "false positive" result), or not similar when they are (a "false negative" result), based on a comparison of one set of features (e.g., low-level features) for the files. For example, assume the original file contains malicious code, such as ransomware, and a similarity space identifies the file as known ransomware based on low-level features for the file that indicate the file is indeed ransomware. A malicious actor or software may copy and rename the file, and then modify it, for example, by wrapping, packing or interspersing the malicious code in the renamed file with benign or inert code. As an example, benign or inert code is code that does not execute or otherwise does not change the runtime behavior or family membership of the file, so the renamed file still contains ransomware that causes significant problems when the file is executed, plus the benign or inert code. However, packing the renamed file with benign code, in this example, changes the low-level features for the renamed file such that when the similarity space compares the low-level features for the renamed file with the low-level features of the known ransomware file or other ransomware files in the same family or category, it could fail to adjudicate the renamed file as ransomware. In this manner, the malicious actor/software fools the similarity space, which fails to detect the renamed file as ransomware. In other words, the similarity space produces a false negative result when comparing the renamed file to the original file or other, similar, ransomware files.

Conversely, a malicious actor or software may manipulate a file in such a manner that another similarity space may not be fooled in adjudicating the manipulated file and the original file or files in the same family as the original file are either similar when they are not (a "false positive" result), or not similar when they are (a "false negative" result), based on a comparison of another set of features for the files (e.g., high-level features, or events that occur as a result of execution of the files). Continuing with the above example, assume the original file contains malicious code, such as ransomware, and the other similarity space identifies the file as known ransomware based on high-level features for the file that indicate the file is indeed ransomware. A malicious actor or software may copy and rename the file, and then modify it in the same manner, for example, by wrapping, packing or interspersing the malicious code in the renamed file with benign code. Even though packing the renamed file with benign code changes the low-level features for the renamed file, the other similarity space compares the high-level features for the renamed file with the high-level features of the known ransomware file or other files in the same family, and accurately adjudicates the renamed file as ransomware. In this manner, the malicious actor/malicious software fails to fool the other similarity space, which successfully detects the renamed file as ransomware.

Embodiments subsequently described herein remediate the false positive results and/or the false negative results that may occur when a malicious actor or software manipulates a file in such a manner that one or another similarity space may be fooled in adjudicating the manipulated file as either similar to the original file when they are not (the "false positive" result), or not similar to the original file (or files in the same family) when they are (the "false negative" result), based solely on a comparison of one set of features (e.g., low-level features, or high-level features, but not both) for the files. This is accomplished by constructing multiple similarity spaces each based on a respectively different set of features (e.g., constructing a first similarity space based on low-level features, a second similarity space based on high-level features, and a third similarity space based on behavioral sequence features) for the files. Thus, a suite of similarity spaces is provided each defining a point of view regarding similarity between objects, such as similarity between files or the contents, aspects, or features thereof.

One similarity space in the suite may adjudicate two files as similar or not based on the similarity, or not, of one set of features for the two files, while another similarity space in the suite may adjudicate two files as similar or not based on the similarity, or not, of a different set of features for the two files, and yet another similarity space in the suite may adjudicate two files as similar or not based on yet another set of features for the two files. If a malicious actor or software were to perturb an original file by adding benign code, according to the embodiments described herein, the manipulated file, while it may move quite a distance from the original file in one similarity space, for example, a similarity space that considers only low-level features, the manipulated file may move a smaller distance or in a different direction in another similarity space that considers a different set of features, e.g., high-level (human understandable) features.

Given the construction of multiple similarity spaces, according to embodiments described herein, a mapping of relationships between the similarity spaces can be constructed. In particular, a mapping of relationships between regions of the similarity spaces can be constructed. The mapping of relationships between similarity spaces can then be used to inform where to locate a file in one similarity space based on the location of the file in another similarity space. In particular, and as further described below, the mapping can be used to select in what region of one similarity space to locate the file (or a representation of the file) based on the region of the other similarity space in which the file (or representation thereof) is located. Additionally, as further described below, the mapping of the relationships between similarity spaces can be used to provide an indication (e.g., a human-readable description) about a file or its type or function. For example, given the location of the file in one region of one similarity space and a map of relationships between regions of the similarity space and regions of another similarity space, an indication about the file can be obtained based on its location within a region in the other similarity space.

FIG. 1 depicts an example of a distributed security system 100 for instance within a cloud computing environment associated with the distributed security system 100. The distributed security system 100 includes a security network 102 in which embodiments of the present disclosure may be deployed. The security network 102 can include distributed instances of a computing element 104 that can itself execute instances of computer code to process data as described herein. The instances of computing element 104 can include or be one or more computing devices, such as a workstation, a personal computer (PC), a server or server farm, multiple distributed server farms, a mainframe, virtualized computing elements, or any other sort of computing device or computing devices or combinations thereof. In some examples, a computing element 104 can be a computing device, component, or system that is embedded or otherwise incorporated into another device or system. In some examples, the computing element 104 can also be a stand-alone or embedded component that processes or monitors incoming and/or outgoing data communications, via, for example, one or more communication interfaces 108.

For example, the computing element 104 can be a network firewall, network router, network monitoring component, a supervisory control and data acquisition (SCADA) component, or any other component. In some examples, a computing element 104 of the security network 102 can be operated by, or be associated with, a cloud computing service provider, or a security service provider, that manages and/or operates the distributed security system 100.

In some examples, as described in more detail below, creating multiple similarity spaces, providing mappings of relationships between multiple similarity spaces, and querying the similarity spaces, as depicted at 200 in FIG. 2, involves first constructing two or more similarity spaces, such as a first similarity space 202, a second similarity space 204 and a third similarity space 206. These similarity spaces each comprise vectors, wherein the vectors include feature vectors for different files, or embedding vectors, i.e., embedding representation values corresponding to the feature vectors for the different files, learned from machine learning models. The feature vectors are generated, for example, by a parser or feature extractor, and/or based on information about the files, such as descriptive tag data compiled by analysts. Each similarity space is endowed with some metric, e.g., a function, defining distances between vectors in that similarity space. For example, in second similarity space 204, the distance between any two of vectors 210-215 is defined such that the vectors 210-215 are within or outside a region 216 of the second similarity space 204.

Once the similarity spaces are constructed, a computational model such as an Approximate Nearest Neighbors model is trained on each similarity space for fast querying. For example, the suite of similarity spaces 202, 204 and 206 may be made available to users by leveraging a corresponding suite of vector databases. Each vector database is a fully managed solution for storing, indexing, and searching across an extremely large dataset of unstructured data that leverages the power of the vectors, whether the feature vectors, or embedding vectors learned from a machine learning model. These vector databases can provide fast querying and searching of the similarity spaces at scale by solving the $O(n^2)$ Nearest Neighbors search problem. In one example, the vector databases are maintained by a cloud computing service provider and made available to users via a respective suite of APIs so that a user can input any number of new files.

Embodiments of the present disclosure also train mappings or relationships between the similarity spaces, such that a given map between two similarity spaces provides for moving or transferring a vector for a file in one similarity space to vector for the file in another similarity space.

Corresponding vectors may then be created for one or more of the similarity spaces during an inference workflow of the Approximate Nearest Neighbors model. For example, during the inference workflow of the Approximate Nearest Neighbors model, the model creates a vector 208 relating to events associated with a new file in similarity space 202, and the model creates a vector 215 corresponding to the new file in similarity space 204. The distance or proximity of the vector 215 to other vectors 210-214 in similarity space 204 is based on a metric or function defining distances or proximity between vectors in similarity space 204.

A user can then query, at block 504, and as depicted at 217, the vector database 132A via API 134A for an indication about a new file (e.g., does the file contain ransomware, or a trojan horse virus?) based on the proximity of the vector 210 associated with the new file in the similarity space 130, 204 to other vectors 211-214 for corresponding other files in the similarity space 130, 204. In other words, a user can query whether the new file is similar to other files in the similarity space based on the proximity of the respective vectors of the new file and other files. Similar may be defined, for example, as files in the similarity space being within an epsilon radius, or region 216, of the new file, the value of which can be configurable.

FIG. 3 is a flowchart of a process 300 for creating, and mapping relationships between, several similarity spaces, by which to compare objects, such as files, based on features or aspects of the files, according to embodiments described herein. With reference to FIGS. 1 and 3, at block 302, one or more computing elements 104 or one or more instances of computing elements 104 (hereinafter, simply, "the computing element 104") gathers or receives as input many files, e.g., $FILE_1$ through $FILE_n$, perhaps millions, hundreds of millions, or even billions, of files. Alternatively, or additionally, at block 302, the computing element 104 gathers or receives as input information relating to each file, such as file content, metadata, static, low-level feature data, high-level feature data (such as human readable descriptions of the files), or behavioral sequence data. Example behavioral sequence data includes events that occur when a file is written, read, executed, or when a network connection opened, etc. This data may be obtained by one or more sensors operating on end-user computing device on which the file resides or with which the network connection is opened, and forwarded to the security network 102.

At block 304, the computing element 104 creates a first embedding space including a first set of feature vectors for each received file, $FILE_1$ through $FILE_n$. Accordingly, the computing element 104 identifies a first set of features in a first file, e.g., $FILE_1$. For example, a first feature extractor may be a low-level parser 120 that parses a binary representation of $FILE_1$ to identify and extract low-level features about $FILE_1$. As an example, the Portable Execution scan (pescan) command-line tool that runs on Windows, Linux and Mac OS-X, available from TZWorks LLC, can be used as the low-level parser 120. Next, computing element 104 creates a low-level feature vector for $FILE_1$ based on the low-level features extracted by the first feature extractor. The low-level feature vector may be a simple array in which each entry in the array is assigned a numerical value, such as a floating-point numerical value, that represents a respective low-level feature extracted from the binary representation of $FILE_1$. Similarly, the computing element 104 identifies a first set of features for each of the remaining received files up through and including a last file, e.g., $FILE_n$. For example, the first feature extractor parses a binary representation of $FILE_n$ to identify and extract low-level features about $FILE_n$. Next, computing element 104 creates a low-level feature vector for $FILE_n$ based on the low-level features extracted by the first feature extractor.

In an example of the above-described embodiment, the first embedding space comprises the first set of feature vectors. In an alternative embodiment, the first embedding space can comprise a first set of embedding vectors as a result of a machine learning model, such as a neural network model, applied to the first set of feature vectors. For example, once the first set of feature vectors have been generated at block 304 for all the files received at block 302, the computing element 104 inputs this set of feature vectors, e.g., low-level feature vectors, to an artificial neural network (ANN) model (or simply "ANN") 126. According to the embodiment, ANN 126, during a training workflow, receives this first set of feature vectors as training data and performs non-linear dimensionality reduction on the training data to create, at block 308, a respective embedding representation for each of the files $FILE_1$ through $FILE_n$, based on their respective feature vectors. In one embodiment, the dimensionality reduction creates an embedding space, also known as a latent space or latent feature space. The embedding space is given by a hidden layer in the ANN 126. The embedding space comprises embedding vectors, i.e., embedding representation values corresponding to the first set of feature vectors, wherein each embedding vector corresponds to a respective feature vector. In this manner, the first similarity space, e.g., low-level similarity space 130A, is defined by this embedding space. Once the first similarity space is constructed, an Approximate Nearest Neighbors model is trained on the first similarity space for fast querying. For example, the first similarity space may be made available to users by leveraging a corresponding vector database to provide fast querying and searching of the similar embeddings to a given query vector.

Continuing at block 304, the computing element 104 creates a second embedding space including a second set of feature vectors for each received file, $FILE_1$ through $FILE_n$. Accordingly, the computing element 104 identifies a second set of features in the first file, e.g., $FILE_1$. For example, a second feature extractor may be a high-level parser 122 that parses information gathered about $FILE_1$ to identify and extract high-level features about $FILE_1$. These high-level features can inform how a file behaves at run-time, or whether the file belongs to a certain family or category of files, such as coin miner files, or ransomware. In one example embodiment, the high-level features may be represented by tag vectors, which might be as simple as (1,0,0), (0,1,0), (0,1,1) etc., where the first index indicates "ransomware", the second indicates "worm", and the third indicates "coinminer", etc. Of course, these tag vectors may be many dimensional rather than just three dimensional as described in this example. Alternatively, the second embedding space may be a tag-informed space. For example, the high-level parser 122 may parse a JavaScript Object Notation (JSON) formatted document containing descriptive tags about $FILE_1$ to identify and extract high-level features about the $FILE_1$. As an example, the descriptive tags comprise information about viruses with which $FILE_1$ may be infected or associated, such as a trojan horse virus, or information about cryptocurrency mining software ("coin miners"). The descriptive tags may be generated by datahound tags, software that analyzes $FILE_1$, or input by security threat researchers and analysts, data scientists, and cybersecurity protection service providers. Next, computing element 104 creates a high-level feature vector for $FILE_1$ based on the high-level features extracted by the second feature extractor. The high-level feature vector may be a simple array in which each entry in the array is assigned a Boolean value of zero or one, wherein a zero represents the absence of a descriptive tag, or represents a descriptive tag assigned a null value, that is associated with a particular high-level feature, such as a descriptive tag associated with whether $FILE_1$ is or contains ransomware. Conversely, an entry in the array may be assigned a Boolean value of one that represents the presence of a descriptive tag associated with a particular high-level feature, such as a descriptive tag associated with whether $FILE_1$ contains coin miner software or a trojan horse virus. Similarly, the computing element 104 identifies a second set of features for each of the remaining received files up through and including the last file, e.g., $FILE_n$. For example, the second feature extractor parses a JSON formatted document containing descriptive tags about $FILE_n$ to identify and extract high-level features about $FILE_n$. Next, computing element 104 creates a high-level feature vector for $FILE_n$ based on the high-level features extracted by the second feature extractor.

In the above-described embodiment, the second embedding space comprises the second set of feature vectors. In an alternative embodiment, the second embedding space can comprise a second set of embedding vectors as a result of a neural network model applied to the second set of feature vectors. For example, once the second set of feature vectors have been generated at block 304 for all the files received at block 302, the computing element 104 inputs this set of feature vectors, e.g., high-level feature vectors, to ANN 126. This may be the same or a different ANN 126 into which the low-level feature vectors were input. According to an embodiment, ANN 126, during a training workflow, receives this second set of feature vectors as training data and performs non-linear dimensionality reduction on the training data to create, at block 308, a respective embedding representation for each of the files $FILE_1$ through $FILE_n$, based on their respective feature vectors. In one embodiment, the dimensionality reduction creates an embedding space in a hidden layer in the ANN 126. The embedding space comprises embedding vectors, i.e., embedding representation values corresponding to the second set of feature vectors, wherein each embedding vector corresponds to a respective feature vector in the second set of feature vectors. In this manner, the second similarity space, e.g., high-level similarity space 130B, is defined by this embedding space. Once the second similarity space is constructed, an Approximate Nearest Neighbors model is trained on the second similarity space for fast querying. For example, the second similarity space may be made available to users by leveraging a corresponding vector database to provide fast querying and searching of the similar embeddings to a given query vector.

Continuing further at block 304, the computing element 104 creates a third embedding space including a third set of feature vectors for each received file, $FILE_1$ through $FILE_n$. Accordingly, the computing element 104 identifies a third set of features in the first file, e.g., $FILE_1$. For example, a third feature extractor may be a behavioral sequence parser or an events parser 124 that parses information obtained about behaviors and/or events that occur in connection with the $FILE_1$ to identify event type features about $FILE_1$. For example, $FILE_1$ may contain a virus, such as the Sality file infector virus that targets files with file extensions .SCR or .EXE, infecting Microsoft systems. This virus may execute a damaging payload that deletes files with those extensions and terminates security-related processes and services. Event sensors on end-user computing devices may detect events associated with this virus, such as communicating over peer-to-peer networks to form a botnet (i.e., a network of computers, each running a bot) for spam, proxying communications, exfiltrating sensitive data, compromising web servers and coordinating distributed computing tasks, incorporating rootkit functions, which can give root access to an attacker or a malicious program, and other events. Continuing with this example, after the third feature extractor parses the event information for $FILE_1$ to identify event features about $FILE_1$, computing element 104 creates a third feature vector for $FILE_1$ based on the event features extracted by the third feature extractor. Similarly, the computing element 104 identifies a third set of features for each of the remaining received files up through and including the last file, e.g., $FILE_n$. For example, the third feature extractor parses event data about $FILE_n$ to identify and extract event features about $FILE_n$. Next, computing element 104 creates an event feature vector for $FILE_n$ based on the event features extracted by the third feature extractor.

In the above-described embodiment, the third embedding space comprises the third set of feature vectors. In an alternative embodiment, the third embedding space can comprise a third set of embedding vectors as a result of a neural network model applied to the third set of feature vectors. For example, once the third set of feature vectors have been generated at block 304 for all the files received at block 302, the computing element 104 inputs at block 306 this set of feature vectors, e.g., event feature vectors, to ANN 126, whether the same or a different ANN 126 into which the low-level or high-level feature vectors were input. According to an embodiment, ANN 126, during a training workflow, receives this third set of feature vectors as training data and performs non-linear dimensionality reduction on the training data to create, at block 308, a respective embedding representation for each of the files $FILE_1$ through $FILE_n$, based on their respective feature vectors in the third set of feature vectors. In one embodiment, the representation is an embedding space in a hidden layer in the ANN 126 that comprises embedding vectors, i.e., embedding representation values corresponding to the feature vectors in the third set of feature vectors. Each embedding vector therein corresponds to a respective feature vector. In this manner, the third similarity space, e.g., events similarity space 130C, is defined by this embedding space. In one example of the third similarity space 130C, the ANN 126 calculates a proximity of any two embedding vectors, for example, based on a proximity of the respective high-level feature vectors for a corresponding two files. Once the third similarity space is constructed, an Approximate Nearest Neighbors model is trained on the third similarity space for fast querying. For example, the third similarity space may be made available to users by leveraging a corresponding vector database to provide fast querying and searching of the similar embeddings to a given query vector.

While this description refers to three different feature extractions processes, it is contemplated there could be more, or less, feature extractors/parsers that each generate a unique set of feature data in respective feature vectors for each of the received files, according to the described embodiments.

In one example of the first similarity space 130A, the ANN 126 calculates a proximity of any two embedding vectors in the first similarity space 130A, for example, based on a proximity of the respective low-level feature vectors for a corresponding two files. The proximity may be calculated, for example, as a Euclidian distance between the respective low-level feature vectors for a corresponding two files.

According to one embodiment, the first similarity space 130A is partitioned or divided into multiple regions. While this embodiment contemplates the regions as separate or mutually exclusive, it is appreciated in other embodiments that regions may overlap to some extent. For example, regions may be defined by a decision tree or set of decision trees. The respective representations, i.e., embedding vectors corresponding to files $FILE_1$ through $FILE_n$, are located in one of the regions of the first similarity space 130A, at block 310. The proximity of any two embedding vectors in the first similarity space 130A, for example, based on the proximity of the respective low-level feature vectors for a corresponding two files may define whether the respective representations, i.e., embedding vectors, are located in the same or different regions of the first similarity space 130A. For example, the decision trees mentioned above may be used to decide in which region a representation of a file is located, wherein various nodes or decisions in the tree consider the values of one or more features in a feature vector for the corresponding file in deciding in which region to locate the representation of the file.

In one example of the second similarity space 130B, the ANN 126 calculates a proximity of any two embedding vectors in the second similarity space 130B, for example, based on a proximity of the respective high-level feature vectors for a corresponding two files.

According to one embodiment, the second similarity space 130B is divided into multiple regions. The respective representations, i.e., embedding vectors corresponding to files $FILE_1$ through $FILE_n$, are located in one of the regions of the second similarity space 130B at block 310. The proximity of any two embedding vectors in the second similarity space 130B, for example, based on the proximity of the respective low-level feature vectors for a corresponding two files may define whether the respective representations, i.e., embedding vectors, are located in the same or different regions of the second similarity space 130B.

According to one embodiment, the third similarity space 130C is divided into multiple regions. The respective representations, i.e., embedding vectors corresponding to files $FILE_1$ through $FILE_n$, are located in one of the regions of the third similarity space 130C, at block 310. The proximity of any two embedding vectors in the third similarity space 130C, for example, based on the proximity of the respective low-level feature vectors for a corresponding two files may define whether the respective representations, e.g., embedding vectors are located in the same or different regions of the third similarity space 130C.

Given the creation of multiple similarity spaces, such as first similarity space 130A comprising one set of representations of files in the form of a first set of embedding vectors, second similarity space 130B comprising another set of representations of files in the form of a second set of embedding vectors and third similarity space 130C comprising yet another set of representations of files in the form of a third set of embedding vectors, embodiments of the present disclosure can create, at block 312, mappings 136, of the relationships between any two similarity spaces. Particularly, mappings of the relationships between the respective multiple regions of any two similarity spaces can be created at block 312.

In an example embodiment, a function maps the above described third similarity space to the first similarity space. This function may be in the form of a neural network that transforms vectors in the third similarity space into a vector in the first similarity space, or that transforms vectors in the third similarity space into a vector in the second similarity space. Alternatively, as further discussed below, the mapping between similarity spaces may be more of an association rather than a proper function, the distinction being that a "function" is defined as a set of pairs (x_i,y_i) such that x_i=x_j implies y_i=y_j (the 'vertical line test').

It is contemplated that each mapping between similarity spaces can be constructed in a few different ways. For example, a neural network may be trained to map the vectors in a first similarity space directly to the vectors in a second similarity space. As another example, two further embeddings may be trained, the first embedding from the first similarity space to a lower-dimensional third similarity space, and a second embedding from the second similarity space to the same lower-dimensional third space. According to these examples, there are two different representations of the same information in the first and second similarity spaces. Suppose the vectors in the first similarity space are obtained from a set of files via pescan and the vectors in the second similarity space are event or behavioral sequence vectors extracted from the same set of files. The mapping between these similarity spaces may be defined as follows: take a vector v in the first similarity space and map it to the third similarity space. Then perform a nearest neighbors search in the third similarity space. Call the discovered nearest neighbors w_1, . . . , w_k. Given the mapping from second similarity space to the third similarity space, it is known which vectors u_1, . . . , u_k in the second similarity space correspond to the discovered nearest neighbors in the third similarity space. It is then possible to define a mapping M from the first similarity space to the second similarity space, written M: first similarity→second similarity space, as M(v)=u_1, . . . , u_k.

According to an embodiment of the present disclosure, with reference to FIGS. 3 and 7, creating the map of relationships between one or more regions of a first of the similarity spaces and one or more regions of a second of the similarity spaces at block 312, comprises at block 702 identifying a first group or cluster of files for which respective representations are located in one of the regions of the first of the similarity spaces based on the respective feature vectors for the first group of files, at block 704 identifying in the first group of files a second group of files for which respective representations are located in one of the regions of the second of the similarity spaces based on the respective feature vectors for the second group of files, and at block 706 mapping a relationship between the first group of files for which respective representations are located in the region of the first of the similarity spaces and the second group of files for which respective representations are located in the region of the second of the similarity spaces.

The construction of a map of relationships between multiple regions of different similarity spaces, i.e., constructing mappings across paradigms (a "cross paradigm inference"), may involve, in one example implementation, constructing a table, the rows of which are indexed by hashes of the files received at block 302, and the columns of which are indexed by region, or cluster, identifiers (IDs) resulting from clustering different representations of the same files in respective regions, or clusters, of different similarity spaces. A cross paradigm inference in this instance could involve querying about a particular file by selecting a SHA-256 hash of the file, identifying the corresponding row in the table indexed by the hash, performing a cluster ID lookup in the row for a given column representing a region in one similarity space and then indexing into other columns representing regions in other similarity spaces to find hashes of files associated with the hash of the queried file for a variety of disparate representations. For example, consider representing a given file in a static, low-level feature vector in one region of one similarity space, and in a behavioral sequence data feature vector in another region of different similarity space. A mapping between these two representations, i.e., a mapping between the two regions across similarity spaces provides the ability to query across paradigms. A simple use case, to illustrate an example, may involve observing a malicious sequence of events generated by a file on an end-user computing device or network, mapping the behavioral sequence representation of the file in a region of a behavioral sequence-, or an events-based similarity space to a region of a static, low-level data-base similarity space via a cross-paradigm map, and then querying for nearest neighbors (i.e., representations of other files) in the same region of the static, low-level data-base similarity space, for example, so that the corresponding files can be blacklisted.

Analysts, such as data scientists or cybersecurity threat researchers, can marginalize, i.e., aggregate over unimportant details of a given file to arrive at a human understandable behavioral description. A tool, operating in accordance with the description herein, in the form of a neural network, that consumes static feature vectors for files and outputs high-level (human readable) descriptive tags for the files allows analysts to study feature vectors of files from the same high-level point of view, i.e., within the same similarity space, without needing to access to the original binary representation of the files in a different similarity space.

According to one embodiment, computing element 104 inputs the similarity spaces to an ANN 126, whether the same or a different ANN 126 into which feature vectors were input. For example, ANN 126, during a training workflow, receives the first similarity space 130A comprising multiple regions in which one or more of the respective representations (i.e., a first set of embedding vectors created for each of the files $FILE_1$ through $FILE_n$ based on their respective feature vectors) may be located, and the second similarity space 130B comprising multiple regions in which one or more of a second set of embedding vectors may be located. The ANN 126 then maps, according to some function, the relationships between the multiple regions of the first similarity space 130A and the multiple regions of the second similarity space 130B and outputs the result, for example, a map, which may be stored as depicted at 136A.

Similarly, ANN 126, during a training workflow, receives the first similarity space 130A comprising multiple regions in which one or more of the respective representations (e.g., the first set of embedding vectors for each of the files $FILE_1$ through $FILE_n$) may be located, and the third similarity space 130C comprising multiple regions in which one or more of the third set of embedding vectors may be located. The ANN 126 then maps the relationships between the multiple regions of the first similarity space 130A and the multiple regions of the third similarity space 130C and outputs the result, for example, a map, which may be stored as depicted at 136B. Finally, ANN 126, during a training workflow, receives the second similarity space 130B comprising multiple regions in which the second set of embedding vectors may be located, and the third similarity space 130C comprising multiple regions in which one or more of the third set of embedding vectors may be located. The ANN 126 then maps the relationships between the multiple regions of the second similarity space 130B and the multiple regions of the third similarity space 130C and outputs the result, for example, a map, which may be stored as depicted at 136C.

Once the various similarity spaces with their respective multiple regions have been created, and the mappings of the relationships between one or more regions in one similarity space with one or more regions in at least another similarity space have also been created, it is possible at runtime to leverage the different similarity spaces, and the mappings between regions of the different similarity spaces, to glean insights about a new file or information related thereto and its similarity, or dissimilarity, with respect to other files located in the same or different regions of the similarity spaces as the new file, as further discussed below. As discussed in more detail below, for example, with reference to FIG. 4, according to embodiments of the present disclosure 400, this process involves selecting and generating one or more feature vectors for a given file or sequence of events related thereto, and then generating a respective one or more embeddings, based on the feature vectors, in an appropriate similarity space. For example, if the feature vector is generated from pescan data, e.g., low-level feature data, then an embedding representation value is generated in low-level feature similarity space. Additionally, or alternatively, if the feature vector is generated from descriptive tag information associated with the given file, e.g., high-level feature data, then an embedding representation value is generated in high-level feature, i.e., a tag-informed, similarity space. And if the feature vector is generated from event data or behavioral sequence data, then an embedding representation value is generated in an events-based similarity space. Importantly, using the previously created mappings of the relationships between one or more regions in one similarity space with one or more regions in at least another similarity space, it is then possible to move an embedding representation value in one similarity space into another similarity space.

With reference to FIG. 4, the computing element 104 gathers or receives as input information relating to a new file, such as file content, metadata, static, low-level feature data, high-level feature data, and/or behavioral sequence data, at block 402. In this example, consider a new file that contains a virus, such as the Sality file infector virus that targets files with file extensions .SCR or .EXE, infecting Microsoft systems. This virus may execute a damaging payload that deletes files with those extensions and terminates security-related processes and services. Event sensors on end-user computing devices may detect events associated with this virus, such as communicating over peer-to-peer networks to form a botnet (i.e., a network of computers, each running a bot) for spam, proxying communications, exfiltrating sensitive data, compromising web servers and coordinating distributed computing tasks, incorporating rootkit functions, which can give root access to an attacker or a malicious program, and other events. Further, consider the new file contains polymorphic code, e.g., code that uses a polymorphic engine to mutate, for example, by inserting benign code, while keeping the original malicious algorithm intact—that is, the code changes itself every time it runs, but the malicious function of the code (its semantics) does not change. Polymorphic code is sometimes used by computer viruses, shellcodes and computer worms to hide their presence. Given the polymorphic code in the new file, a low-level feature data-based similarity space that organizes or categorizes files based on low-level feature data obtained from the files might not recognize, based solely on low-level feature data about the new file, that the new filer is similar to, or merely a revised or modified version of, an earlier, known, version of the file that is already located in a region of the low-level feature data-based similarity space that indicates the earlier version of the file is malicious. Thus, the low-level feature data-based similarity space may incorrectly or inaccurately locate the new file in a region of the low-level feature data-based similarity space that indicates the new file is benign, even though it is malicious, resulting in a false negative categorization of the new file.

Consider, however, construction of multiple similarity spaces, e.g., a first similarity space with embedded vectors based on behavioral sequence feature data, a second similarity space with embedded vectors based on static, low-level feature data, and a third similarity space with embedded vectors based on descriptive tag, i.e., high-level, human readable, feature data, and mappings between the regions of these three spaces, as described above. Consider further a new file infected with the Sality file infector virus has run on a given end-user computing device. Because of the polymorphic nature of the file infector virus, the new infected file yields a hash value that differs from that of the original, or an earlier, version of the infected file. Because the new infected file was able to evade detection (e.g., via a machine learning scoring function), the new infected file presumably ran on the end-user computing device, producing behavioral sequence or event data. This behavioral sequence or event data was detected by sensors on the end-user computing device and forwarded to security network 102, then embedded into a pre-trained behavioral sequence- or an events-based similarity space, hosted as part of a vector database with fast nearest neighbors querying, as described herein. As described below, the representations of files, for example, in the form of embedding vectors, in the behavioral sequence feature data-based similarity space are mapped to regions of the static low-level feature data-based similarity space. This may be useful, for example, in generating and publishing a fuzzy blacklist that can then be pushed to the sensors on end-user computing devices, so that the end-user computing devices can take action to mitigate and/or eliminate the malicious behavior. Furthermore, these same representations of files, e.g., the embedding vectors, can be mapped to regions of the high-level feature data-based similarity space so that analysts can obtain a human readable account of the false negative as well as the published fuzzy blacklists.

Continuing with reference to FIG. 4, the computing element 104 identifies a first set of features in the new file received at block 402. For example, a feature extractor may be a behavioral sequence parser or an events parser 124 that parses information obtained about behaviors and/or events that occur in connection with the execution of the new file to identify behavioral sequence or event type features about the new file. In this example, the new file contains the Sality file infector virus that targets files with file extensions .SCR or .EXE, infecting Microsoft systems, and so the behavioral sequence, or events, data relate to such malicious behavior. After the feature extractor parses the event information for the new file to identify event features about the new file, computing element 104 creates a first feature vector for the new file based on the extracted event features, block 404.

Once the feature vector has been generated at block 404 for the new file received at block 402, the computing element 104 inputs the first feature vector, e.g., a behavioral sequence or events feature vector, to an artificial neural network (ANN) model (or simply "ANN") 126. According to an embodiment, ANN 126, during an inference workflow, receives the first feature vector for the new file and creates, at block 406, a respective first representation, e.g., an embedding vector, for the new file, based on its respective feature vector in a first similarity space, e.g., a behavioral sequence feature data-based similarity space. According to one embodiment, the first similarity space is partitioned or divided into multiple regions. The respective representation corresponding to the new file is located in one of the regions of the first similarity space.

Given the mapping of relationships between regions of different similarity spaces according to embodiments as described above, an ANN 126 moves the first representation of the new file to a second similarity space at block 408, creating a second representation in the second similarity space. This second representation of the new file is located in a region of the second similarity space, e.g., a first region of a static, low-level feature data-based similarity space, based on the map of the relationships between the regions of the first and second similarity spaces.

With reference to the flowchart 500 in FIG. 5, both the first and second similarity spaces are stored in respective vector databases at block 502 after the training workflow described above with reference to FIG. 3. The similarity spaces and respective vector databases updated as new files are received and representations of such constructed and located in regions of the similarity spaces, as described above with reference to FIG. 4. Thereafter the vector databases may be queried at block 504. For example, an analyst can query the vector database in which the second, static, low-level feature data-based similarity space is stored for an indication about the new file based on the first region of the second similarity space in which the second representation of the new file was located at block 408. For example, the query could return an indication whether the new file is malicious, or not, based on the region in the second similarity space in which its second representation is located, and, in particular, whether representations of other files in the same region are considered or labeled as malicious or benign. At block 506, such an indication can be output, for example, in the form of a fuzzy blacklist if the other files in the region are considered malicious, and the new file, by virtue of its second representation being located in the same region, also being considered similar and therefore malicious.

Notably, continuing with reference to FIG. 4, the computing element 104 also identifies a second set of features in the new file received at block 402. For example, a feature extractor may be a low-level parser 120 that extracts static, low-level feature data about the new file. In this example, the new file contains the Sality file infector virus, but because the malicious code is polymorphic, the low-level parser does not recognize in the extracted static, low-level feature data that the new file is a malicious file. After the feature extractor parses the low-level information for the new file, computing element 104 creates a second feature vector for the new file based on the extracted static features, at block 410. Once the feature vector has been generated at block 410 for the new file, the computing element 104 inputs the second feature vector, e.g., a static, low-level feature vector, to ANN 126. ANN 126, during an inference workflow, receives the second feature vector for the new file and creates, at block 412, a respective third representation, e.g., an embedding vector, for the new file, based on its respective feature vector in a second similarity space, e.g., a static, low-level feature data-based similarity space. This third representation of the new file is different than the second representation of the new file located at block 408 in a first region of the second similarity space. According to the embodiments, this second similarity space is partitioned or divided into multiple regions. The third representation corresponding to the new file is located in a second one of the regions of the second similarity space, at block 412. The second region in the second similarity space is different than the first region in the second similarity space in which the other, second, representation of the new file is located, because the ANN 126 failed, in generating this third representation of the new file fails, to adjudicate the new file as malicious, looking solely at it from the perspective of static feature data, and locate it accordingly in the same region of the second similarity space as the second representation of the new file.

With reference to FIG. 6, according to another embodiment 600, the computing element 104 gathers or receives as input information relating to a new file, such as high-level feature data, and/or behavioral sequence data, at block 602. As previously described with reference to FIG. 4, in this example, consider the new file contains the Sality file infector virus. As further previously described, consider further that multiple similarity spaces have been constructed, e.g., a first similarity space with embedded vectors based on behavioral sequence feature data, and a second similarity space with embedded vectors based on high-level feature data or descriptive tag feature data, i.e., human readable feature data, and mappings between the regions of these three spaces have also been constructed, as described above. Consider further a new file infected with the Sality file infector virus has run on a given end-user computing device. Because the new infected file was able to evade detection, the new infected file presumably ran on the end-user computing device, producing behavioral sequence or event data. This behavioral sequence or event data was detected by sensors on the end-user computing device and forwarded to security network 102, then embedded into the first, pre-trained behavioral sequence- or an events-based, similarity space, hosted as part of a vector database with fast nearest neighbors querying, as described herein. As described below, the representations of files, for example, in the form of embedding vectors, in the behavioral sequence feature data-based similarity space are mapped to regions of the high-level feature data-based similarity space. This may be useful, for example, in generating and publishing a human readable description of the new file and similarly located files that can then be reviewed by analysts so that action can be taken to mitigate and/or eliminate the malicious behavior.

Continuing with reference to FIG. 6, the computing element 104 identifies a first set of features in the new file received at block 602. For example, a feature extractor may be a behavioral sequence parser or an events parser 124 that parses information obtained about behaviors and/or events that occur in connection with the execution of the new file to identify behavioral sequence or event type features about the new file. In this example, the new file contains the Sality file infector virus that targets files with file extensions .SCR or .EXE, infecting Microsoft systems, and so the behavioral sequence, or events, data relate to such malicious behavior. After the feature extractor parses the event information for the new file to identify event features about the new file, computing element 104 creates a first feature vector for the new file based on the extracted event features, block 604.

Once the feature vector has been generated at block 604 for the new file received at block 602, the computing element 104 inputs the first feature vector, e.g., a behavioral sequence or events feature vector, to an ANN 126. According to an embodiment, ANN 126, during an inference workflow, receives the first feature vector for the new file and creates, at block 608, a respective representation, e.g., an embedding vector, for the new file, based on its respective feature vector in a first similarity space, e.g., a behavioral sequence feature data-based similarity space. According to one embodiment, the first similarity space is partitioned or divided into multiple regions. The respective representation corresponding to the new file is located in one of the regions of the first similarity space.

Similarly, computing element 104 identifies a second set of features in the new file received at block 602. For example, a feature extractor may be a high-level parser 122 that parses high-level descriptive information or tags obtained the new file to identify a type of the new file. Continuing with the example described above, the new file is described as malicious, and containing the Sality file infector virus. After the feature extractor parses the high-level descriptive information for the new file to obtain a human readable description of the new file, computing element 104 creates a second feature vector for the new file based on the extracted high-level features, block 606.

Once the feature vector has been generated at block 606 for the new file received at block 602, the computing element 104 inputs the second feature vector, e.g., a high-level feature vector, to an ANN 126. According to an embodiment, ANN 126, during an inference workflow, receives the second feature vector for the new file and creates, at block 610, a respective second representation, e.g., an embedding vector, for the new file, based on its respective feature vector in a second similarity space, e.g., a high-level feature data-based similarity space. According to one embodiment, the second similarity space is partitioned or divided into multiple regions. The respective representation corresponding to the new file is located in one of the regions of the second similarity space.

Given the mapping of relationships between regions of different similarity spaces according to embodiments as described above, a link exists between the first region in the first, behavioral sequence feature data-based, similarity space in which the first representation of the new file was located at block 608 and the first region in the second, high-level feature data-based, similarity space in which the second representation of the new file was located at block 610. The first and second similarity spaces are stored at block 612 in respective vector databases after a training workflow such as described above with reference to FIG. 3. The similarity spaces and respective vector databases are updated at block 612 as new files are received and representations of such are constructed and located in regions of the similarity spaces, as described above with reference to FIG. 6. Thereafter the vector databases may be queried. For example, at block 614 an analyst can query the vector database in which the second, high-level feature data-based similarity space is stored for an indication about the new file based on the first region of the first, behavioral sequence feature data-based similarity space in which the first representation of the new file was located at block 608, and given the map of the relationship between the first region in the first similarity space and the first region in the second similarity space. For example, the query could return a human readable description about the new file, for example, whether it is malicious, or not, based on the first region in the second similarity space in which its second representation is located, and, in particular, whether representations of other files in the same region are considered or labeled as malicious or benign.

Figure 2:
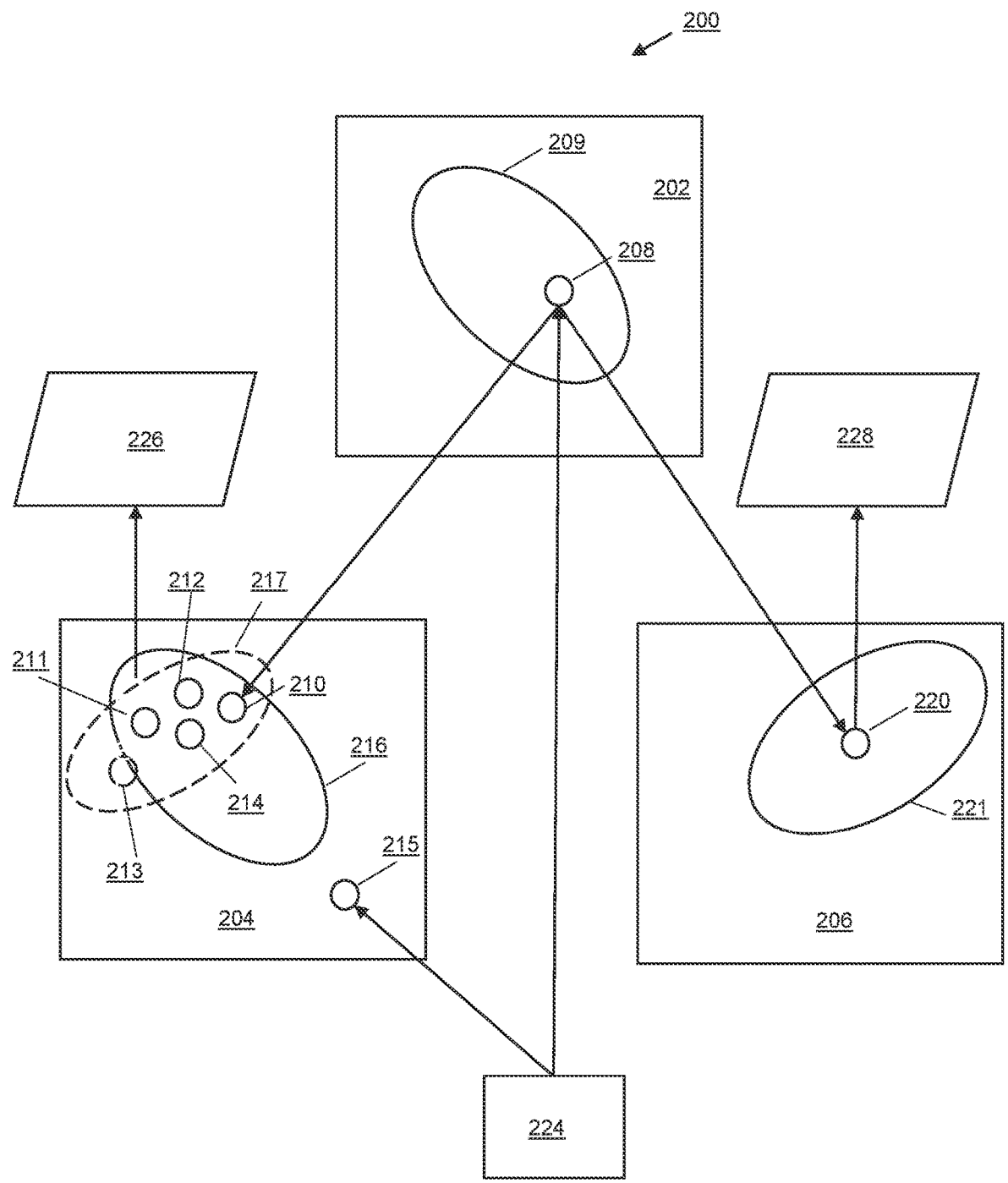
FIG. 2 is a depiction of a map of several similarity spaces, and querying the same, according to example embodiments of the present disclosure.

A use example 200 of embodiments of the present disclosure, with reference to FIG. 2, supposes three spaces: a first, behavioral sequences or events-based, similarity space 202 representing events or behavioral sequences; a second, static, low-level features data-based, similarity space 204 that is hosted as part of a vector database with fast nearest neighbors querying capability; and a third, high-level features data or descriptive tag features data, i.e., human readable features data-based, space 206. Each space maintains representations of files, or events or information relating to files in one or more regions in the space. For example, the behavioral sequences or events-based, similarity space 202 maintains a representation of an event 208 associated with a file, located in a region 209 therein. Likewise, the static features similarity space 204 maintains representations of files, 210-214 located in a region 216 of the similarity space, and a representation 215 of a file otherwise located in the similarity space 204. Finally, descriptive tags space 206 maintains descriptive tags, such as tag 220 located in a region 221 of space 206.

Relationships may be mapped between the spaces, for example, a map may identify relationships between region 209 in the behavioral sequences or events-based similarity space 202 and region 216 in low-level features data-based similarity space 204. Another map may identify relationships between region 209 in the behavioral sequences or events-based similarity space 202 and region 221 in descriptive tags space 206, essentially providing an auto-tagging scheme, i.e., a map from behavioral sequence space to tag space, in which a map applied to an events sequence embedding vector outputs an appropriate set of descriptive tags that comprise a human readable description of the corresponding event sequence.

At runtime, according to this example, a malicious polymorphic file 224 is executed which, by definition, alters the contents of the malicious file. The altered, or modified, file, discovered, for example, by security threat software or analysts, appears benign because of the alteration to the file, so the representation 215 of this altered file in the low-level features data-based similarity space 204 is located away from representations 210-214 of malicious files similar to the original file. Execution of the file 224 further creates one or more events. The events may be recorded and reported to security network 102. A computing element 104 may then create embedding representation values, or simply, a representation 208, of these events. The representation 208 may be maintained in a region 209 of the behavioral sequences or events-based similarity space 202. A map of the relationships between the behavioral sequences or events-based similarity space 202 and the low-level features data-based similarity space 204 can be used to move the representation 208 in space 202 to space 204, depicted as representation 210 located in region 216 of similarity space 204. According to this example, a fast nearest neighbors search can then be performed on the resulting representation 210, which in this case results in representations 211-214 of files similar to the original file 224 being returned as depicted at 217, since they are located in the same region 216 as the representation 210 of the original file. According to an embodiment, a report 226, e.g., a fuzzy blacklist, may be published which highlights the files discovered as a result of the search. Steps or actions can also be taken to disallow files corresponding to these representations from being executed on computing devices connected to security network 102. Additionally, a map of the relationships between the behavioral sequences or events-based similarity space 202 and the descriptive tags space 206 can be used to identify representation 228 located in region 221 of space 206 and publish a report 228 that includes a human-readable account of the malicious attack.

As mentioned above, FIG. 1 depicts an example distributed security system 100 including a security network 102 and one or more instances of computing elements 104. A computing element 104 can be one or more computing devices, such as a workstation, a personal computer (PC), an embedded system, a server or server farm, multiple distributed server farms, a mainframe, or any other type of computing device. As shown in FIG. 1, a computing element 104 can include processor(s) 106, system memory 118, communication interface(s) 108, input/output devices 110, and one or more data storage devices 112, including one or more removable storage devices 114 and one or more non-removable storage devices 116. The one or more removable storage devices 114 or the one or more non-removable storage devices 116 can include a machine readable medium on or in which to store computer code that when executed carries out the methods described herein.

In various examples, the processor(s) 106 can be a central processing unit (CPU), a graphics processing unit (GPU), or both CPU and GPU, or any other type of processing unit. Each of the one or more processor(s) 106 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 106 may also be responsible for executing drivers and other computer-executable instructions for applications, routines, or processes stored in the system memory 118, which can be associated with common types of volatile (RAM) and/or nonvolatile (ROM) memory.

In various examples, the system memory 118 can include volatile memory (such as RAM), non-volatile memory (such as ROM, flash memory, etc.) or some combination of the two. System memory 118 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store information accessed by the computing element 104. Any such non-transitory computer-readable media may be part of the computing element 104.

The system memory 118 can store data, including computer-executable instructions for parsers such as low-level parser 120, high-level parser 122, events parser 124, and one or more artificial neural networks 126. The system memory 118 can further store data 128 or any other modules being processed and/or used by one or more components of computing element 104, including the low-level parser 120, high-level parser 122, events parser 124, and artificial neural network 126. For example, the memory can store as data 128 a suite of similarity spaces 130, including as examples separate similarity spaces 130A, 130B, and 130C, and similarity space mappings 136 between each pair of similarity spaces, such as mappings 136A, 136B and 136C. The system memory 118 can also store as data a suite of vector databases 132, including as examples separate vector databases 132A, 132B and 132C, each of which has access to a corresponding similarity space, and which in turn can be accessed by modules such as a suite of application programmatic interfaces (APIs) 134 including API 134A, 134B and 134C.

The system memory 118 can also store any other modules and data that can be utilized by the computing element 104 to perform or enable performing any action taken by the computing element 104. For example, the modules and data can include a platform, operating system, and/or applications, as well as data utilized by the platform, operating system, and/or applications.

The communication interfaces 108 can link the computing element 104 to other elements in security network 102 through wired or wireless connections. For example, communication interfaces 108 can be wired networking interfaces, such as Ethernet interfaces or other wired data connections, or wireless data interfaces that include transceivers, modems, interfaces, antennas, and/or other components, such as a Wi-Fi interface. The communication interfaces 108 can include one or more modems, receivers, transmitters, antennas, interfaces, error correction units, symbol coders and decoders, processors, chips, application specific integrated circuits (ASICs), programmable circuit (e.g., field programmable gate arrays), software components, firmware components, and/or other components that enable the computing element 104 to send and/or receive data, for example to exchange or provide access to data 128, and/or any other data with the security network 102.

The input/output devices 110 can include one or more types of output devices, such as speakers or a display, such as a liquid crystal display. The output devices can also include ports for one or more peripheral devices, such as headphones, peripheral speakers, and/or a peripheral display. In some examples, a display can be a touch-sensitive display screen, which can also act as an input device. Input devices can include one or more types of input devices, such as a microphone, a keyboard or keypad, and/or a touch-sensitive display, such as the touch-sensitive display screen described above.

The data storage devices 112 can store one or more sets of computer-executable instructions, such as software or firmware, that embodies any one or more of the methodologies or functions described herein. The computer-executable instructions can also reside, completely or at least partially, within the processor(s) 106, system memory 118, and/or communication interface(s) 108 during execution thereof by the computing element 104. The processor(s) 106 and the system memory 118 can also constitute machine readable media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 2-7. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

What is claimed is:

1. A method, comprising:
receiving a plurality of files;
creating, via the plurality of feature extractors, a respective plurality of feature vectors for each file of the plurality of files, each feature vector comprising a plurality of values;
during a training workflow of the neural network model, creating, for each of the respective plurality of feature vectors, a respective similarity space comprising a plurality of regions;
receiving a file;
creating, via a first of the plurality of feature extractors, a first feature vector for the file comprising a plurality of values representing a corresponding first plurality of features for the file; and
during an inference workflow of a neural network model:
creating, in a first of the plurality of similarity spaces, a first representation of the file based on the first feature vector for the file, wherein the first representation of the file is located in a first region of the first of the plurality of similarity spaces;
moving the first representation of the file to a second of the plurality of similarity spaces, thereby creating a second representation of the file located in a first region of the second of the plurality of similarity spaces based on a map of relationships between one or more regions of the first of the plurality of similarity spaces and one or more regions of the second of the plurality of similarity spaces;
receiving an indication of malicious behavior or events in connection with execution of the file based on the first region of the second of the plurality of similarity spaces in which the second representation of the file is located; and
mitigating malicious behavior or events responsive to receiving the indication.

2. The method of claim 1, further comprising:
creating, via a second of the plurality of feature extractors, a second feature vector for the file comprising a plurality of values representing a corresponding second plurality of features for the file; and
during an inference workflow of a neural network model:
creating, in the second of the plurality of similarity spaces, a third representation of the file based on the second feature vector for the file, wherein the third representation of the file is located in a second region of the second of the plurality of similarity spaces.

3. The method of claim 1, further comprising:
storing each of the plurality of similarity spaces in a respective vector database; and
querying the respective vector database in which the second of the plurality of similarity spaces is stored for an indication about the file based on the first region of the second of the plurality of similarity spaces in which the second representation of the file is located.

4. The method of claim 3, further comprising:
outputting the indication about the file; and
wherein the indication about the file based on the first region of the second of the plurality of similarity spaces in which the second representation of the file is located, comprises an indication the file is similar to one or more of a plurality of files for which a respective representation is also located in the first region of the second of the plurality of similarity spaces, an indication the file is dissimilar to one or more of the plurality of files for which a respective representation is located outside the first region of the second of the plurality of similarity spaces, an indication the file is a benign file, or an indication the file is a malicious file.

5. The method of claim 1, wherein the first region and the second region of the second of the plurality of similarity spaces are the same, different, or overlapping, regions of the second of the plurality of similarity spaces.

6. The method of claim 1, further comprising:
during the training workflow of the neural network model:
creating, in each respective similarity space, a representation of each file of the plurality of files based on the corresponding feature vector for the file, wherein the representation of each file of the plurality of files is located in one of the plurality of regions of each respective similarity space; and
creating the map of relationships between the one or more regions of the first of the plurality of similarity spaces and the one or more regions of the second of the plurality of similarity spaces.

7. The method of claim 6, wherein creating the map of relationships between the one or more regions of the first of the plurality of similarity spaces and the one or more regions of the second of the plurality of similarity spaces, comprises:
identifying a first group of the plurality of files for which respective representations are located in one of the plurality of regions of the first of the plurality of similarity spaces based on the respective feature vectors for the first group of the plurality of files; and
identifying in the first group of the plurality of files a second group of the plurality of files for which respective representations are located in one of the plurality of regions of the second of the plurality of similarity spaces based on the respective feature vectors for the second group of the plurality of files; and
mapping a relationship between the first group of the plurality of files for which respective representations are located in the one of the plurality of regions of the first of the plurality of similarity spaces and the second group of the plurality of files for which respective representations are located in the one of the plurality of regions of the second of the plurality of similarity spaces.

8. A method, comprising:
receiving a plurality of files;
creating, via the plurality of feature extractors, a respective plurality of feature vectors for each file of the plurality of files, each feature vector comprising a plurality of values;
during a training workflow of the neural network model, creating, for each of the respective plurality of feature vectors, a respective similarity space comprising a plurality of regions;

receiving a file or respective information related thereto (hereinafter "the file");
creating, via a first of the plurality of feature extractors, a first feature vector for the file comprising a plurality of values representing a corresponding first plurality of features for the file;
creating, via a second of the plurality of feature extractors, a second feature vector for the file comprising a plurality of values representing a corresponding second plurality of features for the file;
during an inference workflow of a neural network model:
creating, in a first of the plurality of similarity spaces, a first representation of the file based on the first feature vector for the file, wherein the first representation of the file is located in a first region of the first of the plurality of similarity spaces;
creating, in a second of the plurality of similarity spaces, a second representation of the file based on the second feature vector for the file, wherein the second representation of the file is located in a first region of the second of the plurality of similarity spaces;
receiving a description about the file, given the first representation of the file located in the first region of the first of the plurality of similarity of spaces, the second representation of the file located in the first region of the second of the plurality of similarity spaces, and a map of relationships between one or more regions of the first of the plurality of similarity spaces and one or more regions of the second of the plurality of similarity spaces; and
mitigating malicious behavior or events in connection with execution of the file responsive to the description about the file.

9. A computer system comprising:
one or more processors;
a memory to store computer-executable instructions that, when executed by the one or more processors, cause the one or more processors to perform operations comprising:
receiving a plurality of files;
creating, via the plurality of feature extractors, a respective plurality of feature vectors for each file of the plurality of files, each feature vector comprising a plurality of values;
during a training workflow of the neural network model, creating, for each of the respective plurality of feature vectors, a respective similarity space comprising a plurality of regions;
receiving a file or respective information related thereto (hereinafter "the file");
creating, via a first of the plurality of feature extractors, a first feature vector for the file comprising a plurality of values representing a corresponding first plurality of features for the file; and
during an inference workflow of a neural network model:
creating, in a first of the plurality of similarity spaces, a first representation of the file based on the first feature vector for the file, wherein the first representation of the file is located in a first region of the first of the plurality of similarity spaces;
moving the first representation of the file to a second of the plurality of similarity spaces, thereby creating a second representation of the file located in a first region in of the second of the plurality of similarity spaces based on a map of relationships between one or more regions of the first of the plurality of similarity spaces and one or more regions of the second of the plurality of similarity spaces;
receiving an indication of malicious behavior or events in connection with execution of the file based on the first region of the second of the plurality of similarity spaces in which the second representation of the file is located; and
mitigating the malicious behavior or events responsive to receiving the indication.

10. The computer system of claim 9, further comprising:
storing each of the plurality of similarity spaces in a respective vector database; and
querying the respective vector database in which the second of the plurality of similarity spaces is stored for an indication about the file based on the first region of the second of the plurality of similarity spaces in which the second representation of the file is located.

11. The computer system of claim 10, further comprising:
outputting the indication about the file; and
wherein the indication about the file based on the first region of the second of the plurality of similarity spaces in which the second representation of the file is located, comprises an indication the file is similar to one or more of a plurality of files for which a respective representation is also located in the first region of the second of the plurality of similarity spaces, an indication the file is dissimilar to one or more of the plurality of files for which a respective representation is located outside the first region of the second of the plurality of similarity spaces, an indication the file is a benign file, or an indication the file is a malicious file.

12. A computer system, comprising:
one or more processors;
a memory to store computer-executable instructions that, when executed by the one or more processors, cause the one or more processors to perform operations comprising:
receiving a plurality of files;
creating, via the plurality of feature extractors, a respective plurality of feature vectors for each file of the plurality of files, each feature vector comprising a plurality of values;
during a training workflow of the neural network model, creating, for each of the respective plurality of feature vectors, a respective similarity space comprising a plurality of regions;
receiving a file or respective information related thereto (hereinafter "the file");
creating, via a first of a plurality of feature extractors, a first feature vector for the file comprising a plurality of values representing a corresponding first plurality of features for the file;
creating, via a second of the plurality of feature extractors, a second feature vector for the file comprising a plurality of values representing a corresponding second plurality of features for the file;
during an inference workflow of a neural network model:
creating, in a first of the plurality of similarity spaces, a first representation of the file based on the first feature vector for the file, wherein the first representation of the file is located in a first region of the first of the plurality of similarity spaces;
creating, in a second of the plurality of similarity spaces, a second representation of the file based on the second feature vector for the file, wherein the second representation of the file is located in a first region of the second of the plurality of similarity spaces;

receiving a description about the file, given the first representation of the file located in the first region of the first of the plurality of similarity of spaces, the second representation of the file located in the first region of the second of the plurality of similarity spaces, and a map of relationships between the one or more regions of the first of the plurality of similarity spaces and the one or more regions of the second of the similarity spaces; and mitigating malicious behavior or events in connection with execution of the file responsive to the description about the file.

13. The computer system of claim 9, further comprising:
during the training workflow of the neural network model:
creating, in each respective similarity space, a representation of each file of the plurality of files based on the corresponding feature vector for the file, wherein the representation of each file of the plurality of files is located in one of the plurality of regions of each respective similarity space; and creating the map of relationships between the one or more regions of the first of the plurality of similarity spaces and the one or more regions of the second of the plurality of similarity spaces.

14. The computer system of claim 13, wherein creating the map of relationships between the one or more regions of the first of the plurality of similarity spaces and the one or more regions of the second of the plurality of similarity spaces, comprises:
identifying a first group of the plurality of files for which respective representations are located in one of the plurality of regions of the first of the plurality of similarity spaces based on the respective feature vectors for the first group of the plurality of files; and identifying in the first group of the plurality of files a second group of the plurality of files for which respective representations are located in one of the plurality of regions of the second of the plurality of similarity spaces based on the respective feature vectors for the second group of the plurality of files; and mapping a relationship between the first group of the plurality of files for which respective representations are located in the one of the plurality of regions of the first of the plurality of similarity spaces and the second group of the plurality of files for which respective representations are located in the one of the plurality of regions of the second of the plurality of similarity spaces.

15. One or more non-transitory computer-readable media storing computer-executable instructions that, when executed by one or more processors, cause the one or more processors to perform operations comprising:
receiving a plurality of files;
creating, via the plurality of feature extractors, a respective plurality of feature vectors for each file of the plurality of files, each feature vector comprising a plurality of values;

during a training workflow of the neural network model, creating, for each of the respective plurality of feature vectors, a respective similarity space comprising a plurality of regions;

receiving a file or respective information related thereto (hereinafter "the file");

creating, via a first of a plurality of feature extractors, a first feature vector for the file comprising a plurality of values representing a corresponding first plurality of features for the file; and during an inference workflow of a neural network model:
creating, in a first of the plurality of similarity spaces, a first representation of the file based on the first feature vector for the file, wherein the first representation of the file is located in a first region of the first of the plurality of similarity spaces;

moving the first representation of the file to a second of the plurality of similarity spaces, thereby creating a second representation of the file located in a first region in of the second of the plurality of similarity spaces based on a map of relationships between one or more regions of the first of the plurality of similarity spaces and one or more regions of the second of the plurality of similarity spaces receiving an indication of malicious behavior or events in connection with execution of the file based on the first region of the second of the plurality of similarity spaces in which the second representation of the file is located; and mitigating the malicious behavior or events responsive to receiving the indication.

16. The one or more non-transitory computer-readable media of claim 15, further comprising:
storing each of the plurality of similarity spaces in a respective vector database; and querying the respective vector database in which the second of the plurality of similarity spaces is stored for an indication about the file based on the first region of the second of the plurality of similarity spaces in which the second representation of the file is located.

17. The one or more non-transitory computer-readable media of claim 16, further comprising:
outputting the indication about the file; and
wherein the indication about the file based on the first region of the second of the plurality of similarity spaces in which the second representation of the file is located, comprises an indication the file is similar to one or more of a plurality of files for which a respective representation is also located in the first region of the second of the plurality of similarity spaces, an indication the file is dissimilar to one or more of the plurality of files for which a respective representation is located outside the first region of the second of the plurality of similarity spaces, an indication the file is a benign file, or an indication the file is a malicious file.

18. One or more non-transitory computer-readable media storing computer-executable instructions that, when executed by one or more processors, cause the one or more processors to perform operations comprising:
receiving a plurality of files;
creating, via the plurality of feature extractors, a respective plurality of feature vectors for each file of the plurality of files, each feature vector comprising a plurality of values;

during a training workflow of the neural network model, creating, for each of the respective plurality of feature vectors, a respective similarity space comprising a plurality of regions;

receiving a file or respective information related thereto (hereinafter "the file");

creating, via a first of the plurality of feature extractors, a first feature vector for the file comprising a plurality of values representing a corresponding first plurality of features for the file;

creating, via a second of the plurality of feature extractors, a second feature vector for the file comprising a plurality of values representing a corresponding second plurality of features for the file;

during an inference workflow of a neural network model:

creating, in a first of the plurality of similarity spaces, a first representation of the file based on the first feature vector for the file, wherein the first representation of the file is located in a first region of the first of the plurality of similarity spaces;

creating, in a second of the plurality of similarity spaces, a second representation of the file based on the second feature vector for the file, wherein the second representation of the file is located in a first region of the second of the plurality of similarity spaces;

receiving a description about the file, given the first representation of the file located in the first region of the first of the plurality of similarity of spaces, the second representation of the file located in the first region of the second of the plurality of similarity spaces, and a map of relationships between the one or more regions of the first of the plurality of similarity spaces and or more regions of the second of the plurality of similarity spaces; and mitigating malicious behavior or events in connection with execution of the file responsive to the description about the file.

19. The computer readable media of claim 15, further comprising:

during the training workflow of the neural network model:

creating, in each respective similarity space, a representation of each file of the plurality of files based on the corresponding feature vector for the file, wherein the representation of each file of the plurality of files is located in one of the plurality of regions of each respective similarity space; and creating the map of relationships between the one or more regions of the first of the plurality of similarity spaces and the one or more regions of the second of the plurality of similarity spaces.

20. The computer readable media of claim 19, wherein creating the map of relationships between the one or more regions of the first of the plurality of similarity spaces and the one or more regions of the second of the plurality of similarity spaces, comprises:

identifying a first group of the plurality of files for which respective representations are located in one of the plurality of regions of the first of the plurality of similarity spaces based on the respective feature vectors for the first group of the plurality of files; and identifying in the first group of the plurality of files a second group of the plurality of files for which respective representations are located in one of the plurality of regions of the second of the plurality of similarity spaces based on the respective feature vectors for the second group of the plurality of files; and mapping a relationship between the first group of the plurality of files for which respective representations are located in the one of the plurality of regions of the first of the plurality of similarity spaces and the second group of the plurality of files for which respective representations are located in the one of the plurality of regions of the second of the plurality of similarity spaces.

* * * * *